United States Patent [19]

So et al.

[11] Patent Number: 4,760,138

[45] Date of Patent: Jul. 26, 1988

[54] CARBONATING AGENTS AND THEIR PREPARATION

[75] Inventors: Rebecca S. So, New Milford, Conn.; Albert A. Willi, La Sarraz, Switzerland

[73] Assignee: Nestec S. A., Vevey, Switzerland

[21] Appl. No.: 823,605

[22] Filed: Jan. 29, 1986

Related U.S. Application Data

[63] Continuation-in-part of Ser. No. 680,994, Dec. 13, 1984, abandoned.

[51] Int. Cl.[4] .......................... A23L 2/40; A61K 9/46
[52] U.S. Cl. ....................................... 536/102; 424/44; 426/591; 426/561; 423/430; 423/432; 423/158; 423/165; 536/121; 536/124
[58] Field of Search .................. 536/102, 121, 124; 423/430, 432, 165, 158; 426/591, 561; 424/44

[56] References Cited

U.S. PATENT DOCUMENTS

| | | | |
|---|---|---|---|
| 2,984,543 | 5/1961 | Smith | 426/561 |
| 3,441,417 | 4/1969 | Feldman et al. | 426/591 |
| 3,649,298 | 3/1972 | Kreevoy et al. | 426/591 |
| 4,127,645 | 11/1978 | Witzel et al. | 424/44 |
| 4,237,147 | 12/1980 | Merten et al. | 423/430 |
| 4,343,819 | 8/1982 | Wood et al. | 426/591 |
| 4,613,497 | 9/1986 | Chavkin | 424/44 |

FOREIGN PATENT DOCUMENTS 2037760  7/1980  United Kingdom .

OTHER PUBLICATIONS

Translation: Binding of Carbon Dioxide by Alcohols, Sugars, and Hydroxyacids by M. Siegfried and S. Howwjanz, (Dept. of Chemistry, Inst. of Pysiology), Hoppe Seylers Zeit. Physiol. Chem., vol. 59, 1909, pp. 377–404.

Grabka, J., "Die Rheologie des Zuckerkalkacarbonatkomplexes", Zuckerind., 107, No. 11, pp. 1024–1027, (1982).

Siegfried, M. and Howwjanz, S., "Uber die Bindung von Kohlensaure . . . ", Zeitschrift f. Physiol. Chemie, 59, pp. 376–404, (1909).

Dubourg, J., "Observations Relatives a Lépuration Calcocarbonique . . . ", La Sucre Belge, pp. 237–240, (1950).

Primary Examiner—Ronald W. Griffin
Attorney, Agent, or Firm—Vogt & O'Donnell

[57] ABSTRACT

Dry, stable carbonating agents comprised of a carbohydrate/metal bicarbonate complex are disclosed. The complex is prepared by reacting a carbohydrate with a metal hydroxide or oxide at a temperature not exceeding 25° C. to form a carbohydrate/metal hydroxide adduct to which carbon dioxide is then introduced to form the complex. The complex is then immediately dried, preferably by freeze drying. The carbonating agents are particularly useful as components of dehydrated beverage powders. Upon rehydration, the complex releases carbon dioxide and carbonates the beverage. Additionally, upon rehydration the complex promotes the solubilization of the carbohydrate components in the beverage.

18 Claims, No Drawings

CARBONATING AGENTS AND THEIR PREPARATION

RELATED APPLICATIONS

This application is a continuation-in-part of co-pending U.S. patent application Ser. No. 680,994 filed Dec. 13, 1984, now abandoned.

BACKGROUND OF THE INVENTION

This invention pertains to the field of dry carbonating agents and the means for preparing them. More particularly, the present invention relates to methods of preparing, isolating and using dry, stable complexes of carbohydrate/metal bicarbonate which contain bound water. These carbon dioxide-carrying complexes can be admixed with other dehydrated materials and such mixtures can thereafter be reconstituted as carbonated beverages or used in other applications in which effervescence is desired.

Compounds which have been utilized as carbonating agents in dry form have generally included inorganic carbonates or bicarbonates, the most common of which is sodium bicarbonate. Other agents have included sodium carbonate, potassium carbonate and calcium carbonate. However, these substances have generally been found to be unacceptable when present in amounts sufficient to provide a desirable level of carbonation to a beverage because upon release of carbon dioxide by contact with an acid, the corresponding sodium, potassium and calcium salts result in an undesirable brackish and/or metallic taste.

More particularly, sodium bicarbonate provides a mole ratio of carbon dioxide to sodium ion of at most 1:1, whereas sodium carbonate releases only one mole of carbon dioxide for every two moles of sodium ion. The use of sodium salts, moreover, may not be desirable in certain instances. Potassium carbonate also yields two moles of the potassium ion for each mole of carbon dioxide released and again results in a salty taste.

Calcium carbonate too only provides a mole ratio of 1:1 of carbon dioxide to calcium ion upon release and while it does not produce a distinctly salty taste, in high concentrations it imparts a metallic off-flavor to beverages. It is also insoluble in water, which further reduces its desirability as a carbonating agent. While calcium bicarbonate could be used to provide a theoretical mole ratio of carbon dioxide to calcium ion of 2:1, free calcium bicarbonate is unstable, and it is believed that it has never been isolated in dry form.

Accordingly, as a means of avoiding the presence of metallic ions in carbonating agents and their corresponding disadvantages, organic carriers for carbon dioxide have been sought. In U.S. Pat. No. 3,441,417, a hydroxy carboxylic acid is reacted with phosgene gas to obtain an ester carbonating agent. U.S. Pat. No. 3,649,298 describes methods of making disodium salts of N-carboxy amino acids to be used in combination with anhydrides in beverage concentrates. This process also requires phosgene. The use of phosgene, however, produces products which may cause toxicological problems. Consequently, these products are also undesirable.

A process for the preparation of a L-lysine carbamate as an organic carbon dioxide carrier for effervescent compositions was described in UK Patent Application GB No. 2,037,760 A.

In non-food effervescent applications, while the level of metallic salt content may not be of critical importance, a compound with only a 1:1 mole ratio of carbon dioxide to metallic ion may be economically undesirable because of the amount of such carbonating agent required to achieve a particular carbonation effect.

SUMMARY OF THE INVENTION

The present invention substantially avoids the disadvantages discussed above and provides a method for preparing and isolating a dry, stable carbonating agent complex one mole of which contains at least one to two moles of carbon dioxide which is readily released upon contact with water.

Without wishing to be bound by theory, it is believed that the general formula of the complexes prepared by the processes of the present invention is:

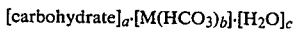

$$[\text{carbohydrate}]_a \cdot [M(HCO_3)_b] \cdot [H_2O]_c$$

where "a" is either 1 or 2; "b" is 1 or 2; "c" is 3, 4 or 5; and M is a metallic cation, in which the metal bicarbonate is stabilized by being part of the carbohydrate matrix.

In general, the carbonating agent complex of the present invention is formed by reacting a carbohydrate with a metallic hydroxide or oxide at a temperature not exceeding 25° C. to first form a carbohydrate/metal hydroxide adduct. Carbon dioxide is then introduced and reacted with the adduct to form the carbonating agent complex. The complex is then immediately dried to form the dry, stable carbonating agent of the present invention.

DETAILED DESCRIPTION OF THE INVENTION

Generally, the carbohydrates which are applicable in the present invention include mono-, di-, and polysaccharides and polyols. These include but are not limited to pentoses, hexoses, and so on of the monosaccharides such as glucose, dextrose, mannose, fructose, galactose, talose, gulose, ribose, arabinose, lyxose, xylose, etc. Disaccharides such as maltose, cellobiose, lactose, sucrose, etc. are also applicable. Dextrin, glycogen, starch, cellulose, polydextrose, raffinose, etc. are typical of the polysaccharides which are applicable. The polyols include sorbitol, glycerol, mannitol, D-xylitol, dulcitol and the like. One or more of these carbohydrates may be used in combination in the reaction mixture.

For preparing the complexes, a carbohydrate solution of up to 60% by weight may theoretically be used, but such a concentrated solution is very viscous and difficult to manipulate. Moreover, the carbon dioxide content of a complex produced using such a high carbohydrate content is generally low. Accordingly, preferred concentrations for the aqueous carbohydrate solution are up to 45% by weight, and preferably from about 2 to 35% by weight, depending upon the particular carbohydrate being employed and the extent of its aqueous solubility. When the carbohydrate concentration is low for a specific carbohydrate, the general tendency of the complex produced is to have a high mole ratio of carbon dioxide to metallic cation, but a lower amount of carbon dioxide release. At or near the saturation level for a particular carbohydrate both the mole ratio and the amount of carbon dioxide released are lower. For dilute solutions, the mixing of two different carbohydrates may be beneficial.

The metallic hydroxides or oxides employed in the present invention may be those of the alkali or alkaline-earth metals. Particularly preferred are calcium hydroxide or oxide for food applications. The calcium ion does not impart a salty taste and is one of the essential minerals needed by the human body. Thus, in addition to serving as a carbonating agent, such complexes may also be utilized to provide medicinal or nutritive supplementation of calcium in the diet. Other applicable hydroxides or oxides include those of potassium, sodium, magnesium, barium, etc. One skilled in the art can readily ascertain which of the cations belonging to these two groups are food acceptable and employ either the hydroxide, oxide, or mixtures thereof accordingly. Any one or more of these hydroxides or oxides may be used simultaneously.

In one method for preparing the carbonating agent complex of the present invention, an aqueous carbohydrate solution as described above is first prepared and a metal hydroxide or oxide is then added to the solution while stirring until the pH of the solution is in the range of from about 9 to 12. The reaction temperature is maintained at less than 25° C., preferably in the range of from about −5° to 10° C. and most preferably about −2° to 4° C. A carbohydrate/metal hydroxide adduct is thus formed in solution.

Carbon dioxide, preferably in gaseous form, is then introduced into the reaction medium, maintained at the above-noted temperatures, until the pH drops to a value of from about 7 to 10 thereby forming a portion of the carbohydrate/metal bicarbonate complex and carbonate precipitates. Another portion of the hydroxide and/or oxide is then added to the reaction medium to again raise the pH to the above noted range of about 9 to 12 and form additional adduct and carbonate precipitate. Carbon dioxide is then once again introduced to lower the pH to the range of 7 to 10 and form still more complex. This procedure is repeated until at least from about 0.25 to 3 times the original amount, on a molar basis, of metal hydroxide or oxide to carbohydrate have been added and a final pH of between 7 to 11 and preferably 9 to 10 is obtained.

The reaction mixture, still maintained at the above-noted temperatures, is then filtered to remove any precipitated material such as the insoluble carbonates, preferably through a chilled filter and under a carbon dioxide blanket to avoid possible product degradation.

The complex, which is recovered in the filtrate, is very unstable in solution and readily decomposes with release of carbon dioxide. Consequently, it should be isolated rapidly by drying the filtered reaction medium. While drying techniques such as spray drying, drum drying and vacuum drying may be employed, possible product degradation may occur with such drying means. Accordingly, the most preferred means for drying and thereby isolating the complex is to immediately freeze the filtered reaction solution followed by freeze drying. Preferably, the solution containing the complex is frozen to below its eutectic temperature at which point the water activity of the complex approaches zero. Generally, the solution is frozen to a temperature in the range of about −10° to −40° C. by means well known to those skilled in the art. The frozen material is then freeze dried in any conventional manner. Generally, the platen temperature of the freeze dryer is in the range of about 10° to 40° C. and at a pressure of about 30 to 100 m bars. The freeze drying is continued to form the isolated, dry and stable carbonating agent complex of the present invention having a moisture content of about 3 to 10% by weight. For convenience, this first method for preparing the carbonating complex will be referred to hereinafter as the "pH control" method.

The carbonate precipitate removed during the filtration step may be heated, if desired, to form the oxide thereof which may then be recycled for further use.

In an alternative method of the present invention, the carbonating agent complex is prepared by employing a mole ratio of carbohydrate to metal hydroxide or oxide in an amount of from about 1:0.25 to 1:3 with the ratio of 1:0.5 to 1:1 being preferred. Applicants have found that this method forms complexes which are somewhat more stable than those formed by the first embodiment.

Generally, in this embodiment too, a carbohydrate solution described above having a concentration of up to about 45% by weight is first cooled to a temperature of less than 25° C., preferably from about −5° to 10° C. and most preferably to about −2° to 4° C. A metal hydroxide and/or oxide as described above is then added to the carbohydrate solution, maintained at the above-noted temperatures, in a stoichiometric amount having a mole ratio of carbohydrate to hydroxide or oxide of from 1:0.25 to 1:3 to form the carbohydrate/metal hydroxide adduct. If necessary, the reaction medium is then filtered in the manner described above. Carbon dioxide, preferably in gaseous form, is then bubbled through the reaction medium until the pH is lowered to a value of about 7 to 11 and preferably to about 9 to 10. Generally, this requires that the reaction medium be saturated with the carbon dioxide.

Once the complex has been formed, it is isolated from the reaction medium by drying in a manner similar to that described above. As in the former embodiment, the further processing steps should be performed expeditiously to prevent product degradation. Isolation by freezing and then freeze drying is still the preferred means for obtaining the dry, stable carbonating agent complex. For convenience, this alternative method for preparing the carbonating complex will be referred to hereinafter as the "stoichiometric" method.

Both of the above embodiments may be carried out by either batch or continuous processing systems. Jacketed feed tanks and pumps may be employed to feed the reactants to pressurized jacketed reaction vessels equipped with agitation means. Recirculation lines may also be employed to ensure completeness of reaction. A sparger assembly may also be connected to the recirculation line for addition of carbon dioxide which may be pressurized by means of a back pressure control valve. After the complex has been formed, it may be passed through a jacketed filter which may include means for washing any precipitate removed from the filtrate.

The reaction products produced by the methods of the present invention are not necessarily pure. Thus, in addition to the desired carbonating complexes, by-products of the reaction such as various carbonates, salts, extraneous complexes and the like may also be present in the resulting reaction product. It is not necessary to remove these "impurities" from the reaction product in order to effectively use the carbonating complexes contained within the product. Moreover, for any specific combination of a particular carbohydrate and a metal hydroxide or oxide, one or more different carbonating complexes may be formed each of which, however, have the desired characteristics of being a dry, stable carbonating agent and, in addition, are believed to have the general formula:

[carbohydrate]$_a$-[M(HCO$_3$)$_b$]·[H$_2$O]$_c$ where "a" is 1 or 2; "b" is 1 or 2; and "c" is 3, 4 or 5; and M is a metallic cation. The formation of more than one specific complex is particularly prevalent where more than one carbohydrate and/or metal hydroxide or oxide is employed. Thus, the carbonating agent of the present invention may comprise, in addition to impurities, a mixture of individual complexes, each individual complex contained therein having effervescent qualities.

In general, applicants have found that the pH control method for preparing the carbonating agents produces a purer product than that obtained by the stoichiometric method. For example, essentially pure sucrose/calcium bicarbonate having the formula:

[C$_{12}$H$_{22}$O$_{11}$]$_2$·[Ca(HCO$_3$)$_2$]·[H$_2$O]$_{3-5}$ can be obtained using the pH control method.

Applicants have determined that the mole ratio of carbon dioxide to metallic cation obtained for a given reaction product is indicative of its purity. In the case of a calcium complex, for example, a pure calcium bicarbonate complex is expected if the product has a CO$_2$/Ca$^{+2}$ mole ratio of 2.0.

Ca(HCO$_3$)$_2$+2H$^+$⇌Ca$^{+2}$+2H$_2$O+2CO$_2$

A smaller mole ratio may indicate the presence of a mixture of calcium bicarbonate/H$_2$O complex and/or calcium carbonate complex and/or the calcium salt of the carbohydrate or even calcium carbonate. The purity of a particular complex is dependent upon the nature of the reactants, the preparation and isolation methods used to prepare the complex, and the conditions employed.

Generally, the carbonating agent complexes prepared by the present invention are able to release approximately 40 to 100 ml of carbon dioxide for each gram of complex. It has been found that, when all else is kept constant, the pH and temperature of the reaction play a role in the attributes of the final product. Generally, the higher the pH at which the reaction is carried out, the smaller the mole ratio of carbon dioxide to metallic cation in the complex, although more carbon dioxide may be available for release per gram of product. This is believed to be due to the formation of the carbonate complex which is more favorable at a higher pH. Even more importantly, however, is the pH value at the end of the reaction. Generally, the final pH of the reaction should be in the range of from about 7 to 11. Preferably, the final reaction pH is in the range of from 9 to 10 which is the most optimum for obtaining the bicarbonate complex. At lower pH values, there is generally less carbon dioxide content in the product and the product is somewhat less stable. At higher pH values, there is a higher carbon dioxide content but the mole ratio of carbon dioxide to metal cation decreases and approaches 1.0.

Generally, the dry, stable carbonating complexes prepared by the present invention are very fine, white powders although the color may vary from a pale yellow to light brown if particular polysaccharides are used.

Depending upon the carbohydrate(s) and metal hydroxide(s) used, the melting point of the particular carbonating complex will, of course, vary. So too, the purity of the complex will also affect the melting point obtained. Generally, applicants have found that the melting point can vary from a low of about 143° C. to a high of about 272° C. Set forth in Table A below is a list of various carbonating complexes prepared by the methods of the present invention. Due to the instability of these complexes in water, applicants have not been able to successfully purify the reaction products. Accordingly, the samples below were tested as is and were not purified so as to isolate pure, individual complexes. The melting points therefore may be those of a mixture of complexes derived from reacting the specific reactants in the manner noted. Furthermore, the complexes do not exhibit a sharply defined melting point. Even with sucrose/calcium bicarbonate which is prepared in essentially pure form using the pH control method, the melting process appears to involve several steps. Its structure collapses at about 70° C.; CO$_2$ gas is released at about 100° C.; the material turns brown at about 170° C.; and finally liquefies at about 200° C. It is this latter liquefaction temperature which has been recorded below for all of the respective samples.

TABLE A

| Sample | Method of Preparation | Melting Point (°C.) n = # of Trials |
|---|---|---|
| Calcium bicarbonate/sucrose | pH control | 201-220 (n = 7) |
| | stoichiometric [sucrose: Ca(OH)$_2$]$_m$ ratio of: | |
| | 1:0.25 | 215 ± 2 (n = 3) |
| | 1:0.5 | 230 ± 3 (n = 3) |
| | 1:0.75 | 244 ± 4 (n = 6) |
| | 1:1.0 | 227 ± 5 (n = 6) |
| Magnesium bicarbonate/sucrose | pH control | 215 ± 2 (n = 3) |
| Calcium bicarbonate/dextrose | pH control | 148 ± 4 (n = 6) |
| Calcium bicarbonate/fructose | stoichiometric [fructose: Ca(OH)$_2$]$_m$ = 1:0.75 | 164 ± 6 (n = 3) |
| Calcium bicarbonate/lactose | stoichiometric [lactose: Ca(OH)$_2$]$_m$ = 1:0.5 | 202 ± 1 (n = 3) |
| Calcium bicarbonate/maltose | stoichiometric [maltose: Ca(OH)$_2$]$_m$ ratio of: | |
| | 1:0.5 | 146 ± 1 (n = 4) |
| | 1:0.75 | 143 ± 3 (n = 3) |
| Calcium bicarbonate/polydextrose* | stoichiometric [polydextrose: Ca(OH)$_2$]$_m$ = 1:1 | 159-272 (n = 6) |
| Calcium bicarbonate/polydextrose* | stoichiometric [polydextrose: Ca(OH)$_2$]$_m$ = 1:1 | 159-272 (n = 6) |
| Calcium bicarbonate/Maltrin DE36 | stoichiometric [total mono- and disaccharides: Ca(OH)$_2$]$_m$ = 1:1 | 167-195 (n = 9) |
| Calcium bicarbonate/corn syrup | stoichiometric [dextrose + maltose content: Ca(OH)$_2$]$_m$ = 1:1 | 219 ± 1 (n = 3) |

*Polydextrose obtained from Pfizer Inc. New York, NY.

Bulk density measurements of a number of the complexes prepared by the present invention are set forth below in Table B. As with the melting point data in Table A, the samples were tested "as is" and may include impurities which were not able to be removed. The data was obtained by measuring volume displacement using mineral oil as a medium.

TABLE B

| Sample | Method of Preparation | Density (g/ml) n = # of Trials |
|---|---|---|
| Calcium bicarbonate/sucrose | pH control | 1.66 ± 0.27 (n = 7) |
| | stoichiometric [sucrose: Ca(OH)$_2$]$_m$ ratio of: | |
| | 1:0.25 | 1.37 ± 0.02 (n = 3) |
| | 1:0.5 | 1.54 ± 0.01 (n = 3) |
| | 1:0.75 | 1.53 ± 0.07 (n = 6) |
| | 1:1.0 | 1.46 ± 0.12 (n = 6) |
| Calcium bicarbonate/dextrose | stoichiometric [dextrose: Ca(OH)$_2$]$_m$ = 1:0.75 | 1.88 ± 0.03 (n = 3) |
| Calcium bicarbonate/fructose | stoichiometric [fructose: Ca(OH)$_2$]$_m$ = 1:0.75 | 1.48 ± 0.06 (n = 3) |
| Calcium bicarbonate/maltose | stoichiometric [maltose: Ca(OH)$_2$]$_m$ = 1:0.75 | 1.70 ± 0.07 (n = 3) |
| Calcium bicarbonate/lactose | stoichiometric [lactose: Ca(OH)$_2$]$_m$ = 1:0.75 | 1.73 ± 0.07 (n = 3) |
| Calcium bicarbonate/polydextrose* | pH control | 1.32 ± 0.08 (n = 3) |
| | stoichiometric [polydextrose: Ca(OH)$_2$]$_m$ = 1:0.75 | 1.68 ± 0.01 (n = 3) |
| Calcium bicarbonate/maltodextrin | stoichiometric [total mono- and disaccharides content: Ca(OH)$_2$]$_m$ = 1:0.75 | 1.39 ± 0.06 (n = 3) |

*Polydextrose obtained from Pfizer Inc., New York, NY.

The complexes may be stored in an air-tight, moisture-free environment at ambient temperature for at least 12 months without any substantial decomposition. Upon contact with water, the complexes readily decompose to release carbon dioxide, the carbohydrate and the corresponding metal carbonate. In turn, the carbonate will decompose to generate further carbon dioxide if it is in an acidic environment.

The complexes of the present invention may be used in food applications as a carbon dioxide carrier for a dry mix of carbonated and isotonic drinks, as a whipping agent to prepare, for example, whipped cream, as a foaming agent such as in hot cocoa mix or cappuccino, or as a dispersing aid to improve, for example, the dispersibility of cocoa powder. The carbonating agent complexes may also be used for non-food applications as well. Thus, a barium complex according to the present invention, although not suitable for typical food or beverage applications, may be used to introduce suitable amounts of barium into the body for medical x-ray applications. In fact, the carbonating agent complexes of the present invention may be used in any application in which the release of carbon dioxide is desirable upon the addition of water. Depending upon the particular application, the amount of complex added to a dry component system may vary from 10 to 85% by weight to provide a specific carbonation or effervescent effect. Inasmuch as a major constituent of the carbonating agent of the present invention is a carbohydrate such as sucrose, the sugar content of the remaining ingredients for a particular application should be reduced accordingly. In addition to serving as a source of carbohydrate thereof, the complexes of the present invention enhance the solubilization of carbohydrates such as sucrose.

The following Examples are set forth to illustrate certain embodiments of the present invention. They are not, however, to be construed as limiting the invention in any manner. The gas volumes are expressed in terms of ml/min measured at standard temperature and pressure.

EXAMPLE I 100 g of sucrose are added to 300 g of water and the solution is cooled to 4.9° C. Calcium hydroxide is added to the solution in small portions with good stirring until the pH is 10.2. Gaseous carbon dioxide is introduced at a rate of 700 ml/min until the pH is lowered to 9.0. Calcium hydroxide is then again added to raise the pH to 10.2 and carbon dioxide is then introduced again to lower the pH to 9.0. This procedure is repeated until 25 g of calcium hydroxide are added and the mole ratio of sucrose to calcium hydroxide is 1:1.5. The final pH of the reaction medium is 9.0 and the total reaction time is 28 minutes.

The reaction medium is then filtered using Whatman No. 41 filter paper (20–25 μm) at a filler temperature of 0° C. using a $CO_2$ blanket. The filtrate is then frozen to −20° C. using a dry ice/acetone bath and stored for 4 hours at −40° C. The product is then freeze-dried at a platen temperature of 15° C. at a pressure of 100 m bars for 36 hours to a moisture content of 7.1% by weight using a Model 50-SRC Virtis freeze dryer.

One gram of the complex contains 41.0 mg calcium ion and 45.5 ml carbon dioxide corresponding to a mole ratio of carbon dioxide to calcium ion of 1.8. The melting point of this complex is 200°±1° C.

The carbonating agent complex of this Example has a high mole ratio of carbon dioxide to calcium ion and a high level of carbon dioxide release. It may be used as a foaming agent, for example, in instant coffee.

EXAMPLE II

A 40% by weight sucrose solution is reacted with calcium hydroxide and carbon dioxide in the same manner as set forth in Example I. The final mole ratio of sucrose to calcium hydroxide is 1:0.87. The temperature of the reaction is maintained at 0° C. and carbon dioxide is added at a rate of 725 ml/min. The pH of the reaction is alternately varied in the range of from 7.8 to 9.5 with the final pH of the reaction medium being 7.7. Total reaction time is 65 minutes.

The product is filtered through a filtering apparatus maintained at a temperature of 23° C. The filtrate is then frozen and freeze-dried in a manner similar to that set forth in Example I.

The carbonating agent complex has a final moisture content of 3.3% by weight and contains per gram 25.9 mg calcium ion and 24.8 ml carbon dioxide, corresponding to a mole ratio of carbon dioxide to calcium of 1.5. As compared to the product of Example I, this product has a lower carbon dioxide content and a lower mole ratio of carbon dioxide to calcium ion due to the relatively high filtration temperature of 23° C. which may give rise to some degradation of the resulting product.

EXAMPLE III 100 g of sucrose are added to 233 g of water and the aqueous solution is cooled to a temperature of 4° C. 5.6 g of calcium hydroxide are added to form a sucrose/calcium hydroxide adduct corresponding to a mole ratio of sucrose to calcium hydroxide of 1:0.25. Gaseous carbon dioxide is then bubbled through the adduct solution at a rate of 700 ml/min until the pH drops from an initial value of 12.1 to a value of 9.4. The total time of the reaction is 20 minutes. The reaction medium is then quick frozen by means of dry ice and freeze-dried in a manner similar to that set forth in Example I.

The dry, stable product has a moisture content of 7.2% by weight and contains per gram 26.4 mg calcium ion and 24.9 ml carbon dioxide corresponding to a mole ratio of carbon dioxide to calcium ion of 1.7. The complex has a melting point of 215°±2.1° C.

As compared to the previous Examples, a lesser amount of calcium hydroxide is employed in making the complex of this Example. This results in a lower carbon dioxide content. The product texture is comparatively more fluffy and less stable.

EXAMPLE IV

Calcium hydroxide is added to a 33% by weight aqueous sucrose solution in a mole ratio of sucrose to calcium hydroxide of 1:1.1 at a temperature of 1° C. Carbon dioxide is introduced into the sucrose/calcium hydroxide adduct solution at a rate of 725 ml/min until the pH drops from an initial value of 12.6 to 9.5. The product is then isolated by freezing and freeze-drying in the manner set forth in Example I. One gram of the complex contains 79.5 mg calcium ion and 84.7 ml carbon dioxide corresponding to a mole ratio of carbon dioxide to calcium ion of 1.8. The melting point of this complex is 227°±4.9° C.

EXAMPLE V

In this Example, the method set forth in Example I is repeated under various processing conditions. The results are set forth in Table I below:

TABLE I

| | SAMPLE # | | | | | |
|---|---|---|---|---|---|---|
| | (1) | (2) | (3) | (4) | (5) | (6) |
| Reactants: | | | | | | |
| Sucrose wt (g) | 100 | 100 | 135 | 100 | 100 | 400 |
| Water (g) | 1000 | 400 | 385 | 300 | 300 | 600 |
| $Ca(OH)_2$ (g) | 43 | 50 | 50 | 55 | 25 | 100 |
| $CO_2$ (ml/min) | 700 | 700 | 600 | 600 | 700 | 725 |
| Reaction: | | | | | | |
| Temp (°C.) | 0 to 2 | −1 to 4 | 0 to 4 | 0 to 4 | 1.2 to 4.9 | −2 to 1 |
| pH range | 7.6 to 11.2 | 8.0 to 11.7 | 8.1 to 9.7 | 8.9 to 10.2 | 9.0 to 10.2 | 7.8 to 9.5 |
| pH final | 8.0 | 8.5 | 7.15 | 9.5 | 9.0 | 7.7 |
| Total time (min) | 51 | 70 | 70 | 133 | 28 | 65 |
| Isolation: | | | | | | |
| Temp of filter (°C.) | 23 | 0 | *0 | 0 | 0 | 23 |
| Temp of filtrate receiver (°C.) | −20 | −20 | −20 | −20 | −20 | −20 |
| Freeze-drying: | | | | | | |
| Time stored at −40° C. (hr) | 4 | 4 | 4 | 4 | 4 | 4 |
| **Dry Temp (°C.) | 15 | 15 | 15 | 15 | 15 | 15 |
| Dry Time (hrs) | 36 | 36 | 36 | 36 | 36 | 36 |
| Product: | | | | | | |
| Moisture (% wt) | 9.5 | 6.2 | 5.0 | 5.7 | 7.1 | 3.3 |
| $Ca^{2+}$ (mg/g) | 24.4 | 41.9 | 41.9 | 45.7 | 41.0 | 25.9 |
| $CO_2$ (ml/g) | 27.7 | 41.8 | 48.6 | 47.4 | 45.5 | 24.8 |
| $(CO_2/Ca^{2+})_m$ | 1.8 | 1.6 | 1.9 | 1.7 | 1.8 | 1.5 |

*A $CO_2$ blanket is used by adding a thin layer of dry ice powder which floats on top of the solution in the filter. The filtrate is quickly frozen on dry ice contained within the collecting flask while the flask is immersed in a dry ice/acetone bath.
**Platen temperature.

The Examples in this table demonstrate that the optimum total solids content in the reaction mixture for a sucrose/calcium system is in the range of from about 15 to 35% by weight. Outside of this range, carbonating complexes are still prepared but with somewhat lower $CO_2$ content.

This table also demonstrates the need for maintaining the filter at a low temperature so as to minimize product degradation which results in lower $CO_2$ content. Note Sample Nos. 1 and 6. Sample 6 shows an even more noticeable effect caused by high filtration temperature due to its higher sucrose content which causes an increase in viscosity and correspondingly lower filtration rate. This results in a lower $CO_2$ content and a lower mole ratio of carbon dioxide to calcium ion.

The benefit of using a $CO_2$ blanket during filtration is also demonstrated (see Sample No. 3). By using a $CO_2$ blanket, product degradation is minimized even at a lower final pH value which generally tends to favor less stable products.

EXAMPLE VI

The procedure of Example I is repeated with different carbohydrates. The results are set forth in Table II below:

TABLE II

| Reactants: carbohydrate | sucrose | dextrose | fructose | corn syrup | dextrin | Maltrin* M365 |
|---|---|---|---|---|---|---|
| Carbohydrate | | | | | | |
| Wt (g) | 100 | 100 | 150 | 100 | 100 | 100 |
| Water (g) | 400 | 400 | 450 | 400 | 400 | 300 |
| $Ca(OH)_2$ (g) | 55 | 50 | 50 | 55 | 50 | 41 |
| $CO_2$ (ml/min) | 600 | 500 | 600 | 500 | 500 | 650 |
| Reaction: | | | | | | |
| Temp (°C.) | −1.5 to 2 | −1 to 9 | −2 to 3 | −1.5 to 1.5 | 0 to 4 | −0.2 to 1.9 |
| pH range | 9.0 to 10.2 | 8.5 to 11.2 | 6.7 to 9.5 | 8.5 to 9.7 | 9.0 to 10.1 | 9.0 to 10.0 |
| pH final | 10.0 | 8.5 | 7.1 | 9.5 | 10.2 | 9.5 |
| Total Time (min) | 68 | 88 | 35 | 91 | 130 | 58 |
| Isolation: | | | | | | |
| Temp of filter (°C.) | 0 | 0 | *0 | 0 | 0 | 0 |
| Temp of filtrate receiver (°C.) | −20 | −20 | −20 | −20 | −15 | −20 |

*Grain Processing Co., Muscatine, Iowa.

TABLE II-continued

| Freeze-dry: | | | | | | |
|---|---|---|---|---|---|---|
| Time stored at −40° C. (hr) | 4 | 4 | 4 | 4 | 4 | 4 |
| **Dry temp (°C.) | 15 | 15 | 15 | 15 | 15 | 15 |
| Dry time (hrs) | 36 | 36 | 36 | 36 | 36 | 36 |
| Product: | | | | | | |
| Moisture (% wt) | 4.9 | 6.21 | 7.0 | 4.2 | 2.6 | 4.9 |
| $Ca^{2+}$ (mg/g) | 50.3 | 39.2 | 58.6 | 36.5 | 42.6 | 50.3 |
| $CO_2$ (ml/g) | 58.3 | 37.0 | 46.9 | 47.6 | 38.2 | 58.3 |
| $(CO_2/Ca^{2+})_m$ | 1.9 | 1.6 | 1.4 | 2.1 | 1.5 | 1.9 |

*The filtrate is quick frozen on dry ice contained within the collecting flask which the flask is immersed in a dry ice/acetone bath.
**Platen temperature.

This table demonstrates the applicability of various carbohydrates to prepare the carbonating agent complexes of the present invention.

EXAMPLE VII

In this Example, the method set forth in Example III is repeated under various processing conditions. The results are set forth below in Table III:

TABLE III

| Reactants: | | | | | | |
|---|---|---|---|---|---|---|
| Sucrose wt (g) | 200 | 100 | 100 | 100 | 100 | 100 |
| Water (g) | 470 | 233 | 234 | 234 | 234 | 300 |
| $Ca(OH)_2$ (g) | 22.2 | 5.6 | 11.1 | 22.2 | 44.4 | 50.0 |
| Sucrose: $Ca(OH)_2$ (mole ratio) | 1:0.5 | 1:0.25 | 1:0.5 | 1:1.1 | 1:2.0 | 1:2.5 |
| $CO_2$ (ml/min) | 725 | 700 | 725 | 725 | 725 | 725 |
| Reaction: | | | | | | |
| Temp (°C.) | 1.1 to 2 | 0 to 4 | 0.8 to 2.2 | 0.8 to 3.2 | −0.5 to 1.8 | 3.6 to 3.8 |
| pH initial | 12.3 | 12.1 | 12.4 | 12.6 | 12.9 | 12.8 |
| pH final | 9.2 | 9.4 | 9.5 | 9.5 | 9.5 | 9.4 |
| Total time (min) | 33 | 20 | 20 | 20 | 40 | 31 |
| Isolation: | | | | | | |
| Frozen temp (°C.) | −40° | −40° | −40° | −40° | −40° | −40° |
| Freeze-dry: | | | | | | |
| Time stored at −40° C. (hr) | 3 | 3 | 3 | 3 | 3 | 3 |
| *Dry temp (°C.) | 15 | 15 | 15 | 15 | 15 | 15 |
| Dry time (hrs) | 36 | 36 | 36 | 36 | 36 | 36 |
| Product: | | | | | | |
| Moisture (% wt) | 6.5 | 7.2 | 6.9 | 8.4 | 8.2 | 10.0 |
| $Ca^{2+}$ (mg/g) | 50.8 | 26.4 | 47.8 | 79.5 | 109.0 | 109.6 |
| $CO_2$ (ml/g) | 57.9 | 24.9 | 49.1 | 84.7 | 103.8 | 91.9 |
| $(CO_2/Ca^{2+})_m$ | 1.9 | 1.7 | 1.7 | 1.8 | 1.6 | 1.4 |

*Platen temperature.

This table demonstrates that as the mole ratio of sucrose to calcium hydroxide decreases, the carbon dioxide content in the final product increases while the ratio of carbon dioxide to calcium ion decreases.

EXAMPLE VIII

In this Example, the effect of pH, particularly the final pH of the reaction medium, is shown for both the method of Example I (Table IVA) as well as the method of Example III (Table IVB). Except for the differences in the pH parameter, all of the remaining parameters remain constant for each of the two methods employed.

TABLE IV A

Reactants: 25% sucrose solution and calcium hydroxide [sucrose/$Ca(OH)_2$] = 1:0.15 mole ratio; T = 0° C.

| pH Range During Reaction | pH Value At End of Reaction | $CO_2$ (ml/g) | $Ca^{2+}$ (mg/g) | $\left(\dfrac{CO_2}{Ca^{2+}}\right)_m$ | $H_2O$ (% wt) |
|---|---|---|---|---|---|
| 8–9 | 8.5 | 35.22 | 32.85 | 1.78 | 5.88 |
| 9–10 | 9.5 | 48.38 | 47.69 | 1.68 | 6.61 |
| 10–11 | 10.5 | 51.74 | 52.14 | 1.64 | 5.92 |
| 11–12 | 11.5 | 59.87 | 69.47 | 1.43 | 5.78 |
| 8–9 | 9.5 | 47.90 | 44.39 | 1.78 | 5.27 |
| 9–10 | 9.5 | 45.60 | 41.25 | 1.83 | 5.70 |
| 10–11 | 9.5 | 47.40 | 43.54 | 1.80 | 6.43 |

TABLE IV B

Reactants: 30% sucrose solution and calcium hydroxide (sucrose/$Ca(OH)_2$) = 1:1 mole ratio; T = 0° C.

| pH After Adduct Formation | pH After $CO_2$ Addition Final pH | $CO_2$ (ml/g) | $Ca^{2+}$ (mg/g) | $\left(\dfrac{CO_2}{Ca^{2+}}\right)_m$ | $H_2O$ (% wt) |
|---|---|---|---|---|---|
| 12.65 | 12 | 63.11 | 87.13 | 1.20 | 8.02 |
| 12.65 | *11.5 | 70.09 | 81.98 | 1.42 | 9.81 |
| 12.65 | **11.4 | 76.60 | 81.99 | 1.55 | 7.41 |
| 12.65 | 10 | 79.98 | 81.98 | 1.62 | 7.54 |
| 12.65 | 9 | 77.68 | 81.94 | 1.57 | 7.86 |

*Solution started to turn white.
**White gel formed.

Table IVA, which sets forth the results of the pH control method at various pH conditions, shows that as the pH increases, the carbon dioxide content is generally higher and the ratio of moles of carbon dioxide to calcium ion decreases. Moreover, it is seen that the composition of the complex generally depends upon the final pH value and not the reaction pH range. Accordingly, essentially the same complex can be obtained regardless of the reaction pH range, provided the final pH is kept the same. The optimum final pH value is seen to be in the range of about 9 to 10.

Table IVB, which sets forth the results of the stoichiometric method at various pH conditions, shows that a final pH value of about 9 to 10 is also optimum for this method as well.

EXAMPLE IX

In this Example, the effect of time elapsed between the end of the reaction and the start of freezing the reaction medium for subsequent freeze-drying is shown for each of the two embodiments of the present invention by setting forth the amount of carbon dioxide lost as a result of decomposition.

TABLE V

| Time Elapsed | % CO$_2$ Lost | |
|---|---|---|
| (min) | Example I Method | Example III Method |
| 0 | 0 | 0 |
| 5 | 15.3 | 0 |
| 10 | 49.7 | 1.7 |
| 20 | 67.9 | 3.5 |
| 30 | 76.3 | 12.6 |

EXAMPLE X

A. Samples of carbonated maltose, sucrose and dextrose all prepared by the method of Example I, are ground and stored with and without a mixture of 8% citric acid in amber glass bottles, having plastic screw caps. The bottles containing samples are stored for 29 weeks, one set being maintained at −16° C., 1 set at 6° C., one set at 23° C. and the final set at 38° C. The bottles are opened once a week for testing and visual examination. After 29 weeks, all samples of the three carbonated sugars visually appear unchanged with the exception of the carbonated sucrose and dextrose samples which were stored at 38° C., which caked. The carbon dioxide content of all three carbonated sugars remains constant with time and temperatures of −16° C., 6° C. and 23° C., respectively. At 38° C., all the carbonated sugars with citric acid lose from 10 to 30% of their carbon dioxide content in 6 weeks and then stabilize, i.e., lose no further carbon dioxide, at about 10 weeks. These tests indicate the importance of storing the carbonating agent complex out of contact with atmospheric moisture. They additionally show that the complex may start to decompose at high temperatures accompanied by long storage times.

B. Samples of ground (about 50 mesh) sucrose/calcium bicarbonate complex prepared by the method of Example I are stored alone and in combination with various ingredients at various temperatures in an airtight foil pouch having a thickness of 0.00035 mm for 12 months before being opened. The amount of degradation of the complex expressed as carbon dioxide lost is shown below:

TABLE VI

| SAMPLES | % CO$_2$ Lost | | | |
|---|---|---|---|---|
| | −16° C. | 6° C. | 23° C. | 38° C. |
| Complex alone | 0 | 0 | 0 | 20 |
| Complex with 8% by weight citric acid | 0 | 0 | 0 | 20 |
| Orange soda mix with 31% by weight of complex | 0 | 0 | 0 | 9 |
| Cappuccino with 10% by weight of complex | 0 | 0 | 8 | 33 |

EXAMPLE XI

Various metallic sucrose bicarbonates are prepared using a variety of different inorganic hydroxides. The method of Example I is repeated with the exception that the metal hydroxides listed below are substituted for the calcium hydroxide. The respective CO$_2$ contents and mole ratios for each complex are set forth in Table VII below:

TABLE VII

| METALLIC SUCROSE CARBONATES | | |
|---|---|---|
| M(OH)$_2$ | CO$_2$ (ml/g) | (CO$_2$/M) moles |
| Ba(OH)$_2$ | 49.0 | 1.4 |
| Mg(OH)$_2$ | 50.4 | 1.4 |
| KOH | 98.0 | 0.6 |
| NaOH | 62.3 | 0.6 |

EXAMPLE XII

In this Example, the effect of different drying techniques is illustrated:

A. Freeze Drying

Calcium hydroxide is added to a 30% by weight aqueous sucrose solution in a mole ratio of sucrose to calcium hydroxide of 1:0.75 at a temperature of 4° C. Gaseous carbon dioxide is introduced at a rate of 600 ml/min. The total reaction time is 30 minutes and the final pH is 10. The product mixture is immediately frozen and stored at −40° C. for 2 hours in a Vitro Model 50-SRC freeze dryer. The product is then freeze-dried at a platen temperature of 30° C. for 18 hours. The resulting complex contains 64 ml of carbon dioxide per gram of complex and a mole ratio of carbon dioxide to calcium ion of 1.7

B. Spray Drying

The reaction is carried out as in Part A above. At the end of the reaction, the mixture is introduced into a spray dryer at the rate of 953 g/min within 5 seconds under a CO$_2$ atmosphere. The conditions of the spray dryer are as follows:

Equipment: Proctor and Schwartz Spray Dryer
Inlet airflow: 56.6 standard m$^3$/min
Inlet temperature: 150° C.
Chamber temperature: 75° C.
Outlet temperature: 65° C.
Air broom on "2"
High air velocity, two fluid nozzle The residence time of the sample in the dryer is less than 30 seconds, however the product is actually dried in about 50 m sec. The complex produced has 69 ml of carbon dioxide per gram of complex and a mole ratio of carbon dioxide to calcium ion of 1.97.

As compared to the technique using freeze drying, the spray drying technique of this example produces a product which has an even higher CO$_2$ content and mole ratio of CO$_2$/Ca$^{+2}$.

C. Drum Drying

The reaction is again carried out as in Part A above. At the end of the reaction, the mixture is introduced into a drum dryer at the following conditions:

Vacuum: 100–120 mm Hg
Inlet temperature: 93.3° C.
Outlet temperature: 93.3° C.
Steam pressure: 0.3 atmospheres
Drum distance: 0.305 mm
Drum speed: 0.5 rpm The dried carbonating agent complex has a carbon dioxide content of 42 ml per gram of product and mole ratio of carbon dioxide to calcium ion of 1.2. There is still enough carbon dioxide in the complex to provide adequate carbonation for many different applications.

EXAMPLE XIII

A dry instant orange shake mixture is prepared in accordance with the following formulation in which the calcium bicarbonate/sucrose complex prepared in Example I acts as a dispersing agent.

| Calcium bicarbonate/sucrose | 30.4% by weight |
| --- | --- |
| Sugar | 32.7% |
| Non-fat dry milk solids | 20.2% |
| Orange juice solids | 9.6% |
| Citric acid | 5.6% |
| Flavor and color additives | 1.5% |

This instant orange shake mix is used in an amount of 110 grams per liter of water.

EXAMPLE XIV

In this Example, fructose/calcium bicarbonate complex prepared in Example VI is employed as a foaming agent in a dry instant coffee drink mix.

| Milk solids | 43.2% by weight |
| --- | --- |
| Sugar | 26.8% |
| Fructose/calcium bicarbonate | 14.8% |
| Instant coffee | 11.1% |
| Cocoa powder | 2.6% |
| Citric acid | 0.9% |
| Flavor additives | 0.6% |

The dry instant coffee drink mix is used in an amount of 150 grams per liter of water.

EXAMPLE XV

In this Example, the dextrose/calcium bicarbonate complex prepared in Example VI is employed as a carbonating agent for an orange soda dry mix.

| Sugar | 53.4% by weight |
| --- | --- |
| Dextrose/calcium bicarbonate | 35.3% |
| Citric acid | 10.7% |
| Orange flavor and color | 0.6% |

The orange soda dry mix is used in an amount of 100 grams per liter of water to provide a carbonated orange soda.

EXAMPLE XVI

A dry non-salty tasting antacid is prepared by mixing 8.5 grams of maltodextrin/calcium bicarbonate complex with 1.5 grams of citric acid. The powder is pressed into 5 gram tablets. When added to water, the tablets dissolve to form a pleasant tasting antacid solution.

EXAMPLE XVII

A dry isotonic drink mix is prepared by mixing the following ingredients:

| Sodium bicarbonate/fructose | 0.14 g |
| --- | --- |
| Magnesium bicarbonate/fructose | 0.04 g |
| Potassium bicarbonate/fructose | 0.19 g |
| Calcium bicarbonate/fructose | 0.07 g |
| Fructose | 4.00 g |
| Citric acid | 0.58 g |

We claim:
1. A method comprising:
   (a) admixing a metal hydroxide, oxide or mixture thereof with an aqueous carbohydrate solution at a temperature of less than 25° C.
   (b) adding carbon dioxide to the solution for forming a reaction medium while maintaining the resulting reaction medium at a temperature of less than 25° C.; and then
   (c) drying the reaction medium for obtaining a dry, stable complex.
2. A method comprising:
   (a) admixing a sufficient amount of a metal hydroxide, oxide or mixture thereof with an aqueous carbohydrate solution, while maintaining the solution at a temperature of less than 25° C., to obtain a pH of from 9 to 12; and then
   (b) adding sufficient carbon dioxide to the solution for forming a reaction medium to lower the pH to within the range of from 7 to 10 while maintaining the resulting reaction medium at a temperature of less than 25° C.;
   (c) repeating steps (a) and (b) until between 0.25 to 3.0 moles of the hydroxide, oxide or mixture thereof has been added for each mole of carbohydrate present and until a pH of from 7 to 10 is obtained;
   (d) filtering the reaction medium; and then
   (e) drying the filtrate for obtaining a dry, stable complex.
3. The method of claim 1, wherein:
   (a) the metal hydroxide, oxide or mixture thereof is admixed with the aqueous carbohydrate solution in an amount such that the mole ratio of carbohydrate to the cation of the metal hydroxide, oxide or mixture thereof is from about 1:0.25 to 1:3.0; and then
   (b) carbon dioxide is added to the solution until the pH of the resulting reaction medium is in the range of from 7 to 11.
4. The method of claim 3, wherein the carbon dioxide is added until the pH of the reaction medium is from 9 to 10.
5. The method of claim 1 or 2 or 3, wherein the carbohydrate is sucrose.
6. The method of claim 1 or 2 or 3, wherein calcium hydroxide, calcium oxide or a mixture thereof is added to the carbohydrate solution.
7. The method of claim 1 or 2 or 3, wherein an alkaline-earth metal hydroxide, oxide or a mixture thereof is added to the carbohydrate solution.
8. A dry, stable composition having the formula comprising:

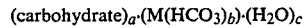

in which
M is a metallic cation,
a is 1 or 2,
b is 1, 2 or 3 and
c is 3, 4 or 5.
9. The composition of claim 8, wherein the metallic cation is selected from the group consisting of alkaline-earth metals and the carbohydrate is selected from the group consisting of mono-, di-, and poly-saccharides and polyols and combinations thereof.
10. A dry, stable composition having the formula comprising:

11. The method of claim 1 or 2 or 3 wherein the temperatures of the solution of step (a) and the reaction medium of step (b) are from −5° C. to 10° C.

12. The method of claim 2 wherein the final pH is from 9–10.

13. The method of claim 1 or 2 or 3 wherein the product obtained by drying comprises a bicarbonate.

14. The product of claim 13 wherein the product is a carbohydrate/metal bicarbonate.

15. The product of claim 13 further comprising carbonates.

16. The method of claim 1 or 2 or 3 or 4 or 12, wherein the drying is performed by a method selected from the group consisting of freeze drying, spray drying, drum drying and vacuum drying.

17. The product prepared by the method of claim 16.

18. The product prepared by the method of claim 1 or 2 or 3.

* * * * *